J. T. HILL.
CIGAR-LIGHTER.

No. 187,629.  Patented Feb. 20, 1877.

WITNESSES  
A. B. Cauldwell  
Philip F. Larner

INVENTOR  
Julius T. Hill  
per C. H. Forbes  
ATTORNEY

UNITED STATES PATENT OFFICE.

JULIEN T. HILL, OF BROOKLYN, ASSIGNOR TO WILLIAM H. BAILEY, OF NEW YORK, N. Y.

IMPROVEMENT IN CIGAR-LIGHTERS.

Specification forming part of Letters Patent No. 187,629, dated February 20, 1877; application filed February 8, 1877.

*To all whom it may concern:*

Be it known that I, JULIEN T. HILL, of the city of Brooklyn, county of Kings, and State of New York, have invented a new and useful Improvement in Cigar-Lighters; and I hereby declare that the following is a full, clear, and exact description thereof, reference being had to the accompanying drawing, forming a part of this specification, in which—

Figure 1:
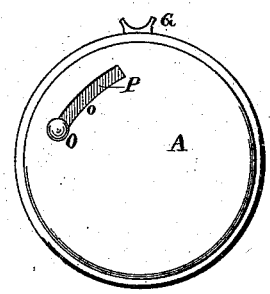
Figure 2:
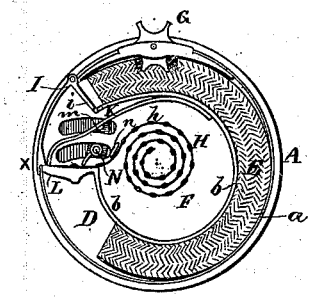
Figure 3:
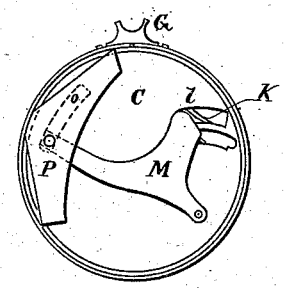
Figure 4:
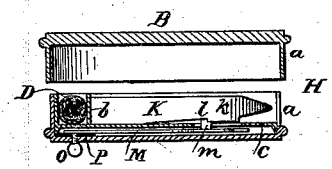
Figure 5:
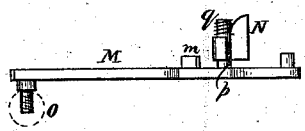

Figure 1 is a view of the device complete. Fig. 2 is a view with the cover removed, showing the internal arrangement of the several parts. Fig. 3 is an opposite view of the removable plate. Fig. 4 is a sectional view on the line *x x*, and Fig. 5 is a detached view of the operating-lever and spring feeding-pawl.

This invention relates to that class of lighting devices in which an adjustable tinder is ignited by a percussion-tape; and the invention consists in the construction and arrangement of the several parts, as hereinafter fully described, and subsequently pointed out in the claims.

In the drawing, A represents the case, and B the detachable cover, each provided with a corresponding rim, *a*, fitted to close one within the other. C is a removable plate, arranged within the case A, and to which are attached the several operative parts. A partition, *b*, is secured to the plate C, and forms an annular chamber, D, to contain the tinder E, and also a chamber, F, to hold the coiled percussion-tape H. An opening, *c*, is made in the rim *a* of the case, through which the tinder and percussion-tape are adjusted for use. This opening is covered by a hinged cap, I, to which is connected an extinguishing-plate, *i*, arranged to close the exit-opening of the annular chamber D when the tinder is drawn inwardly and the cap I closed. A toothed wheel, G, for adjusting the tinder, is arranged to engage therewith, and project through the rim *a* of the case sufficiently to be operated by the thumb, or otherwise, as shown in Figs. 1, 2, and 3. The mechanism for exploding the pellets *h* upon the adjustable igniting-tape H consists in a spring-hammer, K, secured at its inner end to the fixed partition *b*, and having its free end bent and pointed, as shown, to readily penetrate the pellets *h*. An anvil, L, is secured to the plate C, to receive the blow of the spring-hammer K and support the percussion-tape, and also serves to close the inner end of the annular chamber D, and prevent the tinder from being adjusted in contact with the exploding mechanism. A fixed guide, *n*, is secured to the plate to direct the percussion-tape H to the anvil L. The spring-hammer K is operated and the percussion-tape H simultaneously adjusted by means of the pivoted lever M, attached to the opposite side of the plate C, and provided with a projecting arm, *m*, that passes through a curved slot in the plate C, and engages with the spring-hammer, and also provided with a projecting pivot, *p*, which passes through a corresponding slot in said plate, and carries a spring feeding-pawl, N, that engages with the pellets *h* and adjusts the percussion-tape. The lever M is operated by means of the external knob O, the shank of which passes through the slot *o* in the case, and is connected to said lever. The slot *o* is kept covered by means of a plate, P, arranged upon the interior of the case, and attached to the lever M or the shank of the knob O, so as to slide with the movement of said lever, it being constructed of sufficient length to keep the slot *o* covered in all positions of the lever, and thereby prevent the entrance of dirt or other foreign substances.

By unscrewing and removing the knob O, the plate C and the connected mechanism may be removed from the case for cleaning or repairs.

In operating the device, the cap I is opened and the tinder E adjusted forward by means of the wheel G. The lever M is then moved forward by means of the operating-knob O, which causes the arm *m* to engage with and beneath the spring-hammer, and raise the same until said arm meets and passes through the notch *k*, whereby the hammer is released and acts to explode the pellets upon the percussion-tape. A return movement of the lever causes the arm *m* to pass above the hammer, and through the rear notch *l* therein to its first position. This movement causes the arm *m* to slightly compress the hammer before meeting the notch *l*, and when the arm passes through this notch the hammer recoils, which places the arm forward of the notch and in position for the next forward movement.

The percussion-tape is fed forward by means of the spring-pawl N (pivoted upon the lever M) simultaneously with the vertical movement of the hammer.

The coiled spring $q$ is connected to the pivot $p$ and feeding pawl, and retains the latter in contact with the percussion-tape.

I do not herein claim the arrangement of the adjustable tinder within a closed case, nor the combination of said tinder and the percussion-tape as broad claims, for these features are embraced in another application previously filed by me, and now awaiting the result of an interference declared upon said claims; but What I herein claim is—

1. The removable plate C, supporting and combining the essential operative parts specified, substantially as described.

2. The combination of the pivoted lever M, having arm $m$, and the spring-hammer K, provided with the notches $k\ l$, substantially as described.

3. The combination of the pivoted lever M, carrying the spring feeding-pawl N, the anvil L, and fixed guide $n$, for adjusting and supporting the percussion-tape, substantially as described.

4. The pivoted lever M, provided with the operating-knob O, and plate P, covering the slot $o$, substantially as and for the purpose set forth.

JULIEN T. HILL.

Witnesses:
CHAS. W. FORBES,
GEO. H. GRAHAM.